(12) United States Patent
Marchesotti et al.

(10) Patent No.: US 7,898,696 B2
(45) Date of Patent: Mar. 1, 2011

(54) PRINT JOB AESTHETICS ENHANCEMENTS DETECTION AND MODELING THROUGH COMBINED USER ACTIVITY ANALYSIS AND CONTENT MATCHING

(75) Inventors: Luca Marchesotti, Grenoble (FR); Tommaso Colombino, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 965 days.

(21) Appl. No.: 11/801,230

(22) Filed: May 9, 2007

(65) Prior Publication Data
US 2008/0278744 A1 Nov. 13, 2008

(51) Int. Cl.
*G06T 5/00* (2006.01)
(52) U.S. Cl. .................. 358/3.27; 358/1.9; 358/1.15; 358/504
(58) Field of Classification Search ............... 358/3.27, 358/1.9, 1.15, 504
See application file for complete search history.

(56) References Cited

U.S. PATENT DOCUMENTS

| 6,344,902 | B1 | 2/2002 | Duke et al. | |
|---|---|---|---|---|
| 6,803,921 | B1 | 10/2004 | Balasubramanian et al. | |
| 2007/0008594 | A1* | 1/2007 | MacDonald et al. | 358/504 |
| 2008/0068641 | A1* | 3/2008 | Dance et al. | 358/1.15 |

OTHER PUBLICATIONS www.cs.wisc.edu/~ghost/redmon/, Mar. 27, 2004.
http://www.xerox.com/go/xrx/equipment/product_details.jsp?prodID=HP_Openview&Xcnt, printed Mar. 7, 2007.
H.DéJean, J.L.Meunier, *A System for Converting PDF Documents Into Structured XML Format*, 7th IAPR Workshop on Document Analysis Systems, Nelson, New Zealand, Feb. 13-15, 2006.
K.Hadjar, M.Rigamonti, D.Lalanne, R.Ingold, *Xed: A New Tool for eXtracting Hidden Structures from Electronic Documents*, Dial'04, 2004.
M.Riordan, *Variation in Premedia Color and the Potential Automation of Imaging Tasks*, Rochester Institute of Technology, School of Print Media, 2005.
U.S. Appl. No. 11/431,288, filed May 10, 2006, Bressan, et al.
U.S. Appl. No. 11/533,958, filed Nov. 21, 2006, Wolfe, et al.
U.S. Appl. No. 11/640,688, filed Dec. 18, 2006, Wolfe, et al.

* cited by examiner

*Primary Examiner* — Twyler L Haskins
*Assistant Examiner* — Michael Burleson
(74) *Attorney, Agent, or Firm* — Fay Sharpe LLP

(57) ABSTRACT

An automated method for processing a print job includes receiving a submitted print job, extracting features from the submitted print job for characterizing the print job, comparing the extracted features with a predictive model which is based on features extracted from prior print jobs and enhancement operations performed on the prior print jobs, and generating at least one proposed enhancement operation for the submitted print job based on the comparison. The proposed enhancement operations may be presented to an operator for verification or, if the enhancement operations are determined to have a threshold level of confidence, may be automatically applied to the print job.

24 Claims, 7 Drawing Sheets

```xml
<?xml version="1.0" encoding="UTF-8"?>
<segmentation image="IHT_15_09_2003.tif">
   <Threads>
   <Thread x="827" y="955" w="3054" h="3" />
   <Thread x="339" y="1462" w="3981" h="3" />
   <Thread x="3022" y="2076" w="627" h="4" />
   <Thread x="339" y="2501" w="627" h="3" />
   ....
   </Threads>
   <Images>
   <Image x="361" y="1054" w="419" h="318" />
   <Image x="1010" y="1566" w="1968" h="1429" />
   ....
   </Images>
   <Texts>
   <Text x="413" y="15" w="8" h="1" />
   <Text x="1087" y="17" w="1" h="1" />
   <Text x="597" y="19" w="26" h="1" />
   <Text x="1631" y="19" w="5" h="1" />
   ....
   </Texts>
   <Frames>
   <Frame x="1010" y="4114" w="627" h="1082" />
   </Frames>
   <Blocks>
   <Block x="1010" y="4114" w="627" h="1082" />
   <Block x="339" y="207" w="1" h="53" />
   <Block x="1751" y="412" w="911" h="97" />
   <Block x="3029" y="546" w="68" h="63" />
   <Block x="1911" y="973" w="606" h="38" />
   ....
   </Blocks>
</segmentation>
```

*FIG. 5*

PRINT JOB AESTHETICS ENHANCEMENTS DETECTION AND MODELING THROUGH COMBINED USER ACTIVITY ANALYSIS AND CONTENT MATCHING

BACKGROUND

The exemplary embodiment relates to the field of digital image processing. It finds particular application in a workflow system for reducing the amount of time spent in performing image enhancement operations to improve a print job's perceptual quality, and will be described with particular reference thereto.

One of the goals of digital color management technology is to preserve the customer's perceptual intent when color documents are rendered on different devices, such as RGB displays and color printers. In some cases, the customer and printer may make coordinated use of the International Color Consortium (ICC) color profiling protocols. However, in many cases, the customer has little knowledge of the capabilities of the printer and submits print job files with the understanding that the files will be manipulated by the print shop. Or, the customer may submit files as being "ready to print," but which if printed without manipulation, can yield prints with a poor aesthetic quality. As a consequence, the print shop operator often has to reassess the needs and aesthetic choices of the customer and modify the documents accordingly. For example, the print shop operator may modify the document colors of the print job to be more compatible with the color profiles and emulation modes available in the Raster Image Processing (RIP) controller of the printer. Or, the operator may use digital prepress tools, such as image retouching software, to enhance the appearance of the documents, e.g. to improve color balance, dynamic range, and the like.

The lack of specific color management information requires digital press operators to perform an iterative testing and aesthetic enhancement cycle in order to converge toward a set of printing parameters which produces the best perceptual quality. This is often done by testing various parameter configurations to determine which gives the most satisfactory results. These various parameter configurations can be tested by the choice of control parameter settings in the RIP operation. The RIP operation translates document specifications in a page description language (PDL), such as Postscript (PS) or Adobe Portable Document Format (PDF), into a set of color bitmap separations that are images of the document pages. It is an application that runs on a printer's DFE. One of the more commonly used RIP control printing parameters is the choice of printer emulation mode. Other control printing parameters may include rendering intents and GCR (gray component replacement) settings. Or, the adjustments may be made in the digital pre-press.

Unfortunately, there is no simple or intuitive way for the print operator to determine the combination of settings that will produce the most desirable result. Accordingly, print operators will usually make a guess at a combination of RIP settings likely to result in desirable color reproduction. Many combinations of these settings may be tested until satisfactory results are obtained. This process can require a large number of single-print tests and is quite time consuming as each test must be manually set up and initiated on the DFE. This represents a problem for commercial print shops in that it ties up the press in the repeated production of test prints, a process that is costly, time consuming, and an inefficient use of a digital press that is designed not as a proofing machine, but for optimal performance over extended runs. It is also an obstacle to the adoption of automated workflow solutions that depend, in order to produce quality results that meet client expectations, on a level of coordinated color management between the clients of print shops and the print shops that is rarely, if ever, achieved.

INCORPORATION BY REFERENCE

The following references, the disclosures of which are incorporated in their entireties by reference, are mentioned:

U.S. application Ser. No. 11/640,688, filed Dec. 18, 2006, entitled A METHOD AND SYSTEM TO DETERMINE PREFERRED COLOR MANAGEMENT SETTINGS FOR PRINTING DOCUMENTS, by Wolfe, et al., discloses a system and a method for generating a single job that tests multiple image path parameter combinations. The user first selects the part of the document that will be used for the test run. The system then determines all the available image path control parameters and settings that are compatible with the selected document parts. The system builds a menu, and the user chooses the image path control parameters and settings combinations that are to be tested. The user then sends the job to the printer which prints the selected parts of the documents using each of the selected image path parameter combinations. Appropriate labels are included in the printed output so the user can easily identify the combination that delivers the most satisfactory results.

U.S. Pat. No. 6,344,902, entitled APPARATUS AND METHOD FOR USING FEEDBACK AND FEEDFORWARD IN THE GENERATION OF PRESENTATION IMAGES IN A DISTRIBUTED DIGITAL IMAGE PROCESSING SYSTEM, by Charles B. Duke, et al., discloses a system for generating predictable, reproducible, and pleasing images in a distributed digital image processing system which monitors presentation images and provides feedback to a customer that assembled the original image. The originating customer can view the image as it appears on a remote output device and/or adjust the image so that the presentation image will match the image appearing on the image originating device.

U.S. Pat. No. 6,803,921, entitled USE OF SOFTPROOFING TO ASSIST IN THE RENDERING OF IMAGES OF UNKNOWN COLORIMETRY, by Balasubramanian, et al., discloses a softcopy proofing system in which an image or document of unknown colorimetry can be soft proofed iteratively using a range of different source profiles, rendering intents, and color adjustments. The procedure is performed using a softcopy proofing device rather than on the actual press.

U.S. application Ser. No. 11/431,288, filed May 10, 2006, entitled METHOD AND SYSTEM FOR CONTROLLING PRINTER UTILIZATION IN A NETWORKED ENVIRONMENT, by Bressan, et al., discloses a method for controlling a printer in a networked environment by utilizing printer usage statistics and document features to determine whether to print a document or portion of a document. The method includes extracting document and page specific information from the document and determining whether printing of the document or a portion thereof is necessary, based on analysis of the document and page specific information.

U.S. application Ser. No. 11/533,958, filed Nov. 21, 2006, entitled CRITICAL COLOR TOLERANCE GUIDE FOR PRINTERS, by Wolfe, et al., discloses a method of identifying color tolerances in a pre-press document. The method includes viewing the pre-press document in a graphical user interface, tagging selected portions of the document containing a critical color, assigning a color accuracy tolerance level for each of the tagged critical colors, and generating a series of color charts including a master color tolerance chart, a master color aim chart, and a master critical colors chart, the master charts each including all of the tagged critical colors of the document. A hard copy of each of the master color tolerance chart and master color aim chart is printed at a first printer and printing a hard copy of the master critical colors chart at a second printer.

BRIEF DESCRIPTION

In accordance with one aspect of the exemplary embodiment disclosed herein, an automated method for processing a print job includes receiving a submitted print job, extracting features from the submitted print job for characterizing the print job, comparing the extracted features with a predictive model which is based on features extracted from prior print jobs and enhancements performed on the prior print jobs, and generating at least one proposed enhancement for the submitted print job based on the comparison.

In accordance with another aspect of the exemplary embodiment, a print management system for processing a print job includes a model in which features extracted from prior print jobs are linked to enhancement operations performed on the prior print jobs, and an automated aesthetics enhancement tool which extracts features from a submitted print job, compares the extracted features with the model and generates proposed enhancement operations for the submitted print job based on the comparison.

In accordance with another aspect of the exemplary embodiment, method for generating a model for proposing automated enhancement operations for a submitted print job includes, for each of a plurality of print jobs, characterizing the print job through a set of features, and associating any enhancement operations performed by an operator on the print job with the characterized print job, and modeling the characterized print jobs and associated enhancement operations, whereby proposed enhancement operations for a submitted print job are generated when the model is accessed with features of the submitted print job.

BRIEF DESCRIPTION OF THE DRAWINGS

FIG. 5 illustrates an exemplary tagged PDF file which may be used in generating the model of FIG. 4;

DETAILED DESCRIPTION

In the following description, a system and a method are disclosed for helping operators in print shops to reduce the number of iterative print testing cycles normally carried out in production printing environments to improve quality of printed jobs. In particular, image processing techniques are exploited to model print job aesthetics enhancement operations that are normally performed manually by operators. Each enhancement operation generally includes applying a modified set of printing parameters to the print job aimed at achieving a perceived or actual enhancement in an output document, although it need not necessarily do so. An enhancement model can be built by using strategies for tracking and analyzing the processes which lead from an initial draft print job to the final production job. The exploitation of the model can lead to the development of a tool that can be integrated in both manual and automatic production workflows. The tool may be used to improve the performance (i.e., Time To Press (TTP)) of existing workflow tools, both at the Digital Front End and in Digital Pre-Press, by providing adaptive solutions for perceptual quality enhancement parameter selection, and interacting with the operators in the case of low confidence in the correction. The exemplary system thus provides improvements over previous approaches (such as Automatic Image Enhancement (AIE)) in that it is based on a model which is "learned" by using previous enhancements operations. The model can be customized according to one or more categories of print job features. In the exemplary embodiment, the categories are based on the different print job types of a particular customer. The print job types may take into account the type of the print job (e.g., album, calendar, etc.).

A "print job" or "document" is normally a set of related sheets, usually one or more collated copy sets copied from a set of original print job sheets or electronic document page images, from a particular user, or otherwise related. The print job may include or be associated with a job ticket which includes client information and other information on the job type as well as providing printing instructions.

Figure 1:
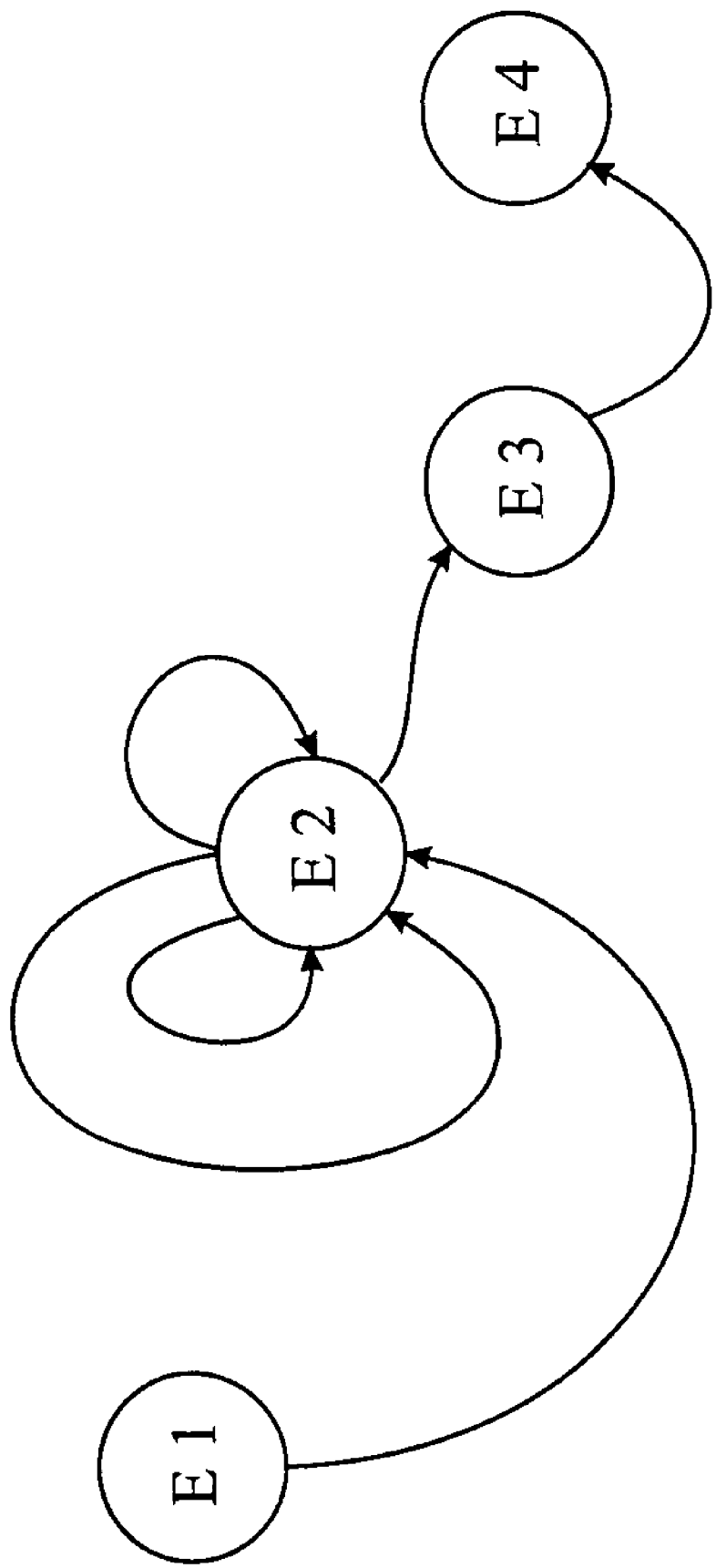
FIG. 1 is a schematic diagram illustrating events in a conventional workflow process.

FIG. 1 illustrates four main events which may occur in a typical conventional workflow system:
  E1: Submission of a new print job
  E2: Enhancement operation(s) for improvement of print job perceptual quality and proofing
  E3: Production print job launched from DFE to digital press
  E4: Delivery of the printed job to the client The exemplary method aims at reducing the iterative testing and aesthetic enhancement cycle represented by E2 by informing the enhancement operations with enhancement operations derived from a model based on prior print job experiences.

One advantage of the exemplary system and method is that an increase in efficiency can be achieved through a substantial reduction of iterative testing cycles in printers, reducing the amount of time to complete printing the print job. Another advantage is that the performance of a printer that is designed for optimal performance over long runs, is not compromised through extensive use as a testing/proofing machine. Moreover, the automatic tracking of user activity, which cannot be easily recorded manually, provides useful data that can be leveraged as training data for the design of correction rules for image aesthetics, and as printer user behavior logs to complement existing machine logs.

Figure 2:
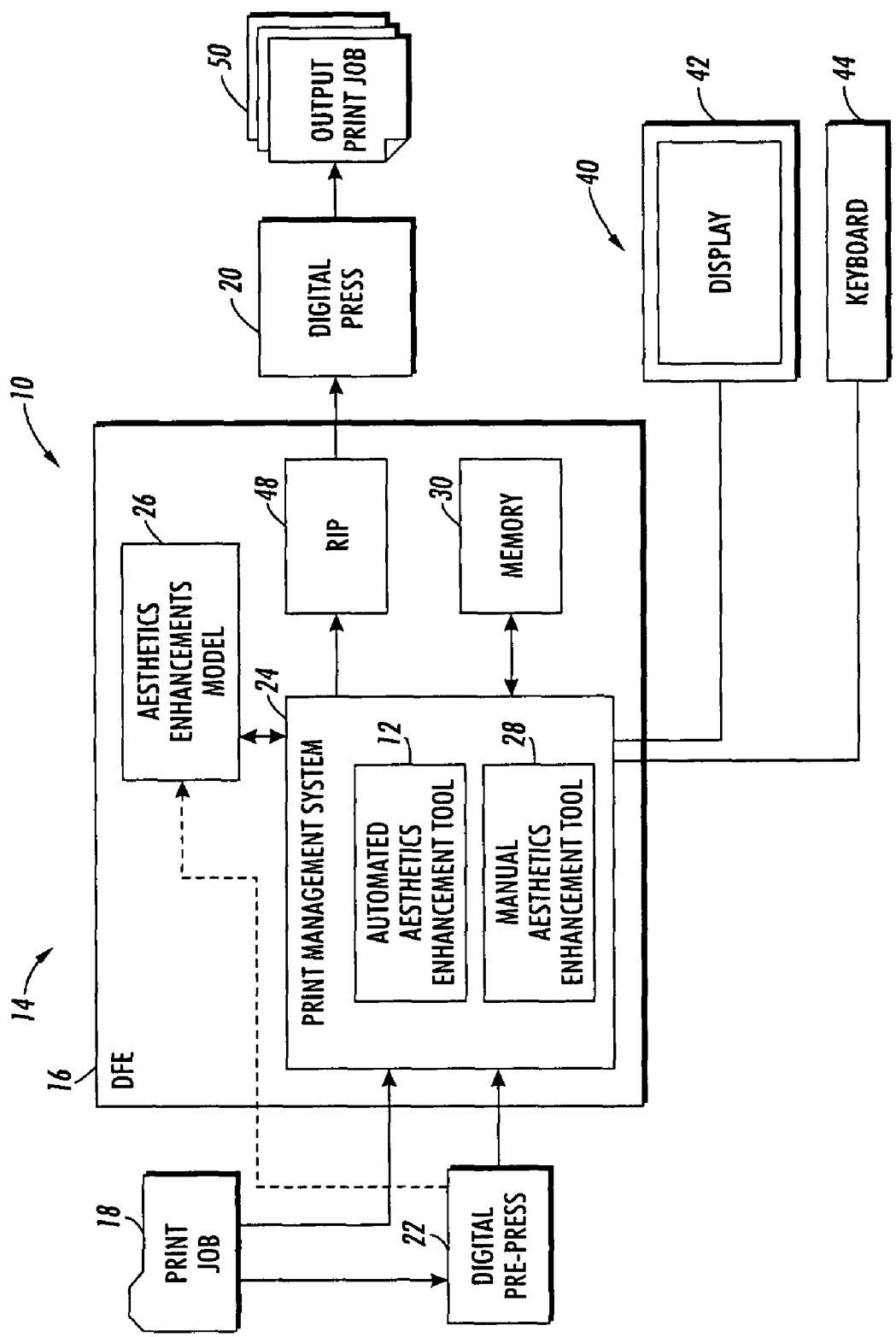
FIG. 2 is a functional block diagram of a workflow system in which a tool for print job aesthetics enhancements detection and modeling operates in accordance with one aspect of the exemplary embodiment.

With reference to FIG. 2, a functional block diagram of a workflow system 10 in which a tool 12 for print job aesthetics enhancements detection and modeling operates in accordance with the exemplary embodiment is shown. As shown, the system 10 includes a printer 14 having a computer control system or digital front end (DFE) 16. The DFE receives an incoming print job 18 and outputs the print job, after processing, to a printer, such as a digital printing press 20. The print job may be submitted directly to the DFE 16 or be preprocessed in digital pre-press 22, e.g., at a workstation remote from the printer using digital image processing tools.

The DFE 16 includes a print management system 24 for modifying printing parameters. The illustrated print management system 24 includes the automated aesthetics enhancement tool 12. The tool 12 automatically generates one or more enhancement operations, each comprising modifications to one or more printing parameters, and optionally proposes the enhancement operation(s) to an operator. In particular, the automated aesthetics enhancement tool 12 extracts features of the print job, such as customer and type of job, and other print job features. The tool accesses an aesthetics enhancement model 26, which models enhancement operations to the print job, based on prior enhancement operations made to similar jobs (i.e., jobs with similar features), and generates proposed enhancement operations therefrom.

The print management system 24 further includes a manual aesthetics enhancement tool 28 for receiving printing parameters of a manual enhancement operation from an operator. The manual aesthetics enhancement tool 28 allows a user to manually select printing parameters for image enhancements through controls on the DFE 16. The tool 26 may further include Digital Pre-Press tools for image retouching such as PaintShop PrO™ or Adobe Photoshop™ software, and the like.

The automated and manual aesthetics enhancements tools 12, 28 may be in the form of add-on software or hardware components which execute instructions stored in associated memory 30. Memory 30, or a separate memory may store print jobs 18 during processing. The memory 30 may represent any type of computer readable medium such as random access memory (RAM), read only memory (ROM), magnetic disk or tape, optical disk, flash memory, or holographic memory. In one embodiment, the memory 30 comprises a combination of random access memory and read only memory. In some embodiments, the print management system 24 and memory 30 may be combined in a single chip.

The print management system 24 communicates with a user interface 40, herein illustrated as an interactive graphical user interface (GUI). The user interface 40 may be a part of the printer 10 or may be located on a workstation remote from the printer. The illustrated GUI 40 includes a visual display 42, such as an LCD screen, and a user input device 44, such as an alphanumeric keyboard, keypad, touch screen, cursor control device, or combination thereof. In some embodiments, an operator can review automated image enhancement suggestions on the display. For example, a list of proposed printing parameters of an enhancement operation may be presented on the display, or a representation of a print job image incorporating the changes may be displayed. The operator can accept the suggested enhancement operations via the user input device 44 and/or make manual adjustments using the manual aesthetics enhancement tool 28.

One of the processing functions performed by the DFE 16 is raster image processing, in which a document description is transformed into an image that can be printed by a marking device. The print management system 24 outputs the print job, as modified, to a raster image processor (RIP) 48 of the DFE 16, which prepares the print job in a suitable format for rendering on the digital press 20.

The digital press 20 generally includes one or more color marking engines which render the print job on print media, such as paper or other suitable media for printing, using colorants, such as inks or toners. The marking engine can be an inkjet marking engine, xerographic marking engine, or the like. As is known in the printing arts, the press may include a combination of two or more marking engines, such as color and black and white engines, and generally further includes other components, such as paper feeders, finishers, and the like.

It should be appreciated that the components of the print management system 24 may reside in a variety of locations on or in connection with the printing press being used. For example, the print management system 24 may reside in the raster image processor (RIP) 48, elsewhere in the digital front end (DFE) 16, or in an upstream software package such as a workflow management software package resident, for example, in the digital pre-press 22. The user interface 40 may also be suitably distributed throughout the workflow system 10.

As will be appreciated, FIG. 2 is a high level functional block diagram of only a portion of the components which are incorporated into a workflow system 10. Since the configuration and operation of printers are well known, they will not be described in further detail.

Figure 3:
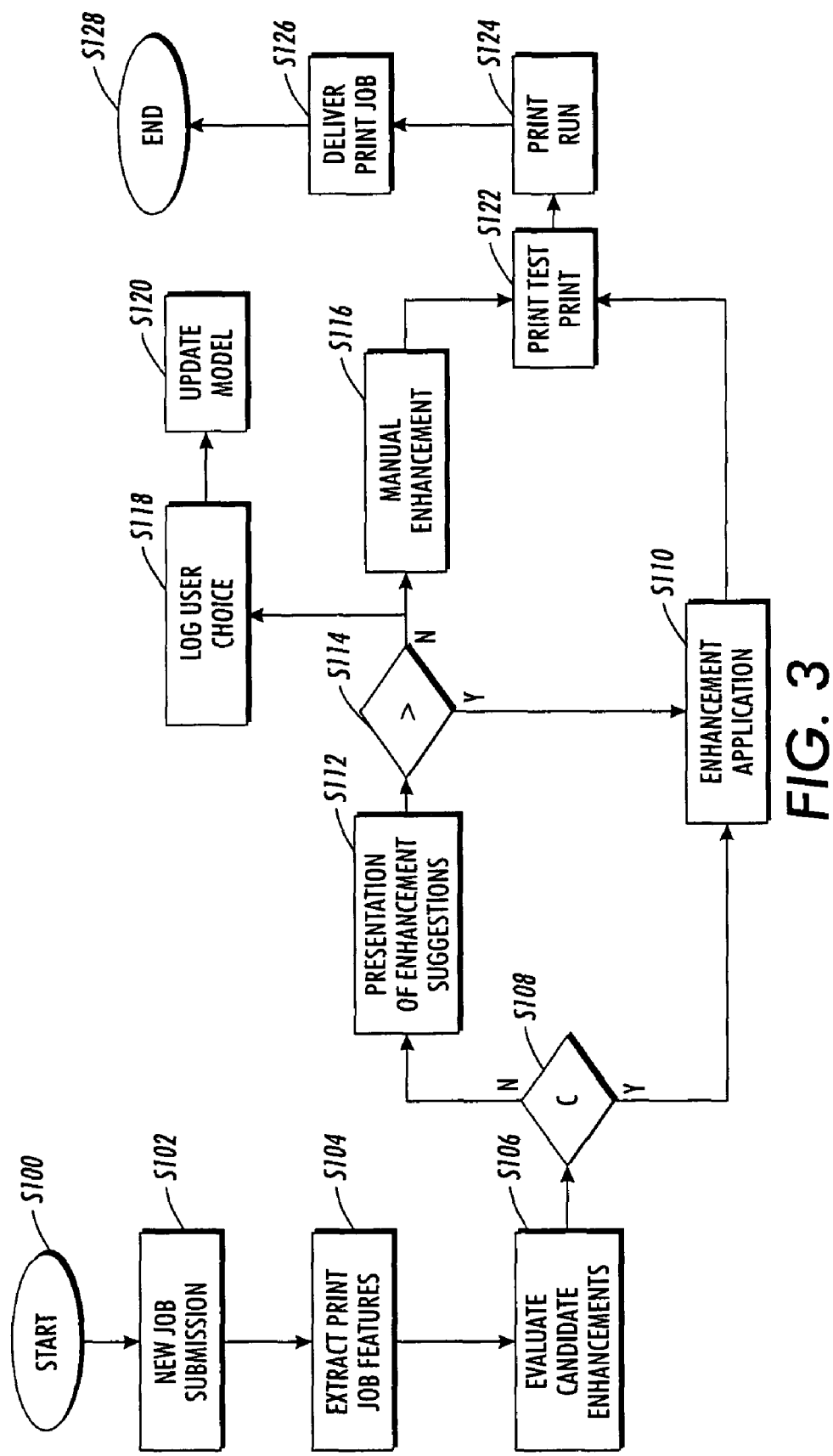
FIG. 3 illustrates a method for providing print job aesthetics enhancements in accordance with another aspect of the exemplary embodiment.

FIG. 3 illustrates an exemplary workflow method in which the print management system 24, including the exemplary automated aesthetics enhancement tool 12, may operate. The method begins at S100. At S102, a new print job is submitted, corresponding to step E1 of the conventional process. The print shop operator may receive a new job to be printed from a specific client via e-mail, file transfer protocol (FTP) upload, CD Rom, DVD, or any other optical medium, a RAM, a PROM, an EPROM, a FLASH-EPROM, USB key, or other memory chip or cartridge, through the use of workflow management tools such as Press Sense's iWay™, or through a web interface to which a customer inputs a request via a web browser. Where a customer makes use of a web portal for submission of the print job, various data are associated with the print job, such as the customer ID, date, number of pages, type of print job, and the like. In other formats, a job ticket associated with the print job may provide some or all of this information. The documents to be printed may be received from the customer in Postscript/PDF or other unstructured or partially structured format. In some cases, the print shop operator may additionally be provided with a hard copy to try to match.

At S104, features of the print job are extracted from the print job by the automated aesthetics enhancement tool 12. Prior to extracting features, the print job may be converted to a more structured format, such as an XML file. Further details of step S104 are described below, in connection with comparable step S218 of the method for generating the model, illustrated in FIG. 4.

At S106, candidate enhancement operations are evaluated. For example, the model 26 is accessed by the automated aesthetics enhancement tool 12 to retrieve a set of printing parameters for an enhancement operation, based on the extracted features of the submitted print job. Exemplary printing parameters for an enhancement may be selected from: image contrast values, saturation, exposure, color balance, brightness, background color, emulation mode (e.g., SWOP (Specifications for Web Offset Publications), FOGRA, GRACoL, ISOCoated, Euroscale, Japan CMYK, or the like), tone reproduction curves for C (cyan), Y (yellow), M (magenta), and K (key—black), screening method, such as the screening resolution, gray component replacement (GCR), ink saving, and combinations thereof.

In a conventional workflow system, the operator of the printer at E2 of the workflow performs an iterative testing and aesthetic enhancement cycle in order to converge towards a set of printing parameters that produces the best perceptual quality. These kinds of enhancement operations can be performed at the Digital Front End 16 or in Digital Pre-Press 22. In the present embodiment, however, the convergence towards the best compromise of printing parameters for any given job is analyzed by assembling a generic and predictive correlation model 26 of print job aesthetic printing parameters with document features, such as content type, as described in further detail with reference to FIG. 4. Thus, at S106, the assembled model 26 is accessed to retrieve candidate job enhancement operations. This may be achieved by comparing a set of features of the submitted job with features of prior print jobs stored in the model and retrieving the enhancement operation performed in the prior job or jobs which provide the best match of features. A minimum edit distance or other similarity measure may be computed between the features of the submitted print job and features stored in the model to determine the prior job or jobs which match most closely.

At S108, a confidence evaluation (C) may be performed by the tool 12. In particular, a confidence measure may be determined to evaluate a probability that the features of the submitted job match those of a prior job stored in the model, i.e., that the retrieved parameters of an enhancement operation are appropriate for the submitted job. If the tool determines that a candidate enhancement operation has a high confidence (i.e., at or exceeding a preselected confidence threshold) of being appropriate for the submitted print job, at S110, the enhancement operation may be applied automatically to the print job. If the confidence is lower (i.e., below a preselected confidence threshold), at S112 an enhancement operation for improvement of print job perceptual quality may be presented to the operator via the GUI 40.

At S114, in a verification step (V), the user is given the opportunity to accept or decline the proposed enhancement operation. If user accepts the automated enhancement, the method proceeds to step S110, and the printing parameters of the enhancement operation are applied to the print job. If at S114, the user declines the proposed automatic enhancement, the operator may make manual adjustments to the printing parameters, using the manual tool (S116). The user's selection and/or parameters of the manual enhancement operations may be logged (S118) for subsequent incorporation into the model 26 (S120).

At S122, a proofing step may include printing a test print for proofing of the print job. The proof may be shown to the customer for approval.

At S124, the production print job is launched from the DFE to the digital press 20 (as for step E3 of the conventional process), where the final version of the print job is printed in the requested number of copies. At S126, the finished job layouts 50 are delivered to the client (as for step E4 of the conventional process). The method ends at S128.

The exemplary method does not prevent a manual enhancement cycle, as illustrated by step S116. In the exemplary method, step E2 type events are represented/replaced by at least some of steps S104, S106, S108, S110, S112, S114, S116, and S122.

Further details of the generation of the model 26 will now be described with reference to FIG. 4, in which an exemplary method for generating the aesthetics enhancement model is illustrated. The exemplary method aims to capture aesthetic enhancement operations applied to the different versions of a print job produced by the operators of the printer and to model them coherently for future exploitation. The model is gradually built as print jobs are submitted and processed by the operator by extracting information from the print job and linking the information to a record of the enhancement operations performed by the operator. Print jobs submitted by print shop clients to the print management system, or submitted by the Digital Pre-Press to the DFE under the form of PostScript/PDF files, trigger an analysis on the events normally carried out by operators which are aimed at enhancing the quality of the documents. This enhancement is mainly performed by altering printing parameters related to document appearance (color curves, brightness, etc.) using DFE embedded software 28 and/or Digital Pre-Press software 22. In the first instance, the printing parameters set at the DFE are tracked and stored. This feature based analysis leads to the definition of the general enhancement model 26.

The method begins at S200. At S202, a print job is submitted.

At S204, an operator may validate the new job and, if no changes are needed, may submit it for printing (S206).

If at S204, the operator decides to alter the printing parameters, the operator at this point of the workflow performs an iterative testing and aesthetic enhancement cycle in order to converge towards a set of parameters that produces the best perceptual quality. For example, at S208, the operator may send a test print to the printer S208. At S210, the operator may perform an enhancement operation which includes adjustment to one or more printing parameters. Steps S208 and S210 may be repeated one or more times as the operator makes further adjustments to the printing parameters. Finally, the operator may send the approved print job for printing at S206 and at S212, the final print job is delivered to the customer.

During some or all of the steps described above, data is collected for identifying print job features and enhancement operations (S114).

At S216, a learning phase takes place. The learning phase can take place at any time following collection of the data from one or more print jobs. The learning phase may include the following substeps. At S218, given a new print job, selected features are extracted at different abstraction levels (e.g., in three categories: Print Job, Document, and Object Level). These features are then related to the particular aesthetic enhancement operations which were carried out on the print job. The enhancement operations may be extracted from different versions of the print job during the iterative testing cycle. At S220, a temporal matching among the different versions of the same document sent to the DFE is performed in order to assemble a coherent chronological print job version history (i.e., job tracking). At S222, once the job history end is reached (this is typically detectable when the production printing run is launched at S206), the enhancement model 26 can be learned by "example" by correlating the extracted features with parameters selected in the enhancement operations. Further details of the learning phase now follow.

Print Job analysis: Features and Enhancement Operations Extraction (S218)

In order to analyze print jobs and the aesthetic quality enhancement operations normally associated with them, two main steps may be performed:

1. Characterization of the print job typology through a set of heterogeneous print job features (S218A).

2. Association of the enhancement operations (if there are some) with the analyzed print job (S218B).

Step 218A includes analyzing parameters related to printing infrastructures, print shop customers' preferences and also acquiring the print job data in the form of PDF/PS files, generally from the DFE 16. In some embodiments, some of the information (such as customer name and job type) can be gathered from other workflow devices using existing tools normally used for printing environments monitoring and job tracking such as HP Web JetAdmin™, Xerox CentreWare™ Web, Lexmark Markvision™, or Dell Open Manage Printer Management. For example, a client server suite of applications, such as Xerox Device Manager (XDM) accessible through Xerox CentreWareWeb™ can be installed into a print shop network. Such a monitoring system is able to mine information regarding jobs as well as to intercept data to be printed and to store it in the form of a PDF/PS file.

With this kind of tool features of the print job can be extracted at different levels of abstraction:

Print Job Level: features related to the print job.

Document Level: features related to the document within the print job.

Object Level: features related to sub-parts which compose the document.

At the Print Job Level, for example, the following selected features can be recorded by tracking print job properties, such as one or more of:

Username of the customer for the job

Job type (e.g., calendar, brochure, photo album, color photo album, B&W brochure, brochure with lots of text, etc.)

Number of copies of the same document

Paper Size (A4, A3, etc.)

Imposition method, which determines the order and orientation and arrangement of pages for finishing Time the job was launched Print range, which is the percentage of the pages of the document which have to be printed.

The job type information may be assigned to the print job by the customer. It is also contemplated that the job type may be identified from a set of other features.

At the Document Level, further features can be extracted such as one or more of:

Color mode (Color vs. Grayscale), this defines whether the print job is in color or black and white.

Relative amount of K (black), toner to be using when printing grays and black.

Number of Pages

Object Level features define the properties of the objects within a given document to be printed. A segmentation of the different elements (i.e. text, bitmap and vectorial images) comprising the document file can be performed. In one embodiment, the document to be printed is received in the form of PDF/PS file or may be converted to a PDF/PS file with a software application such as Red Mon™ (See, e.g., www.c-s.wisc.edu/~ghost/redmon/), which is able to dump print jobs from a printer queue. The PDF files can be modified to contain objects data identified by specific tags or embedded in images. Different approaches including optical character recognition (OCR) and zoning, PDF tag parsing, and image processing can be used to identify the object level features. In particular, the approaches presented in Hervé Déjean and Jean-Luc Meunier, "System for Converting PDF Documents into Structured XML Format," 7th IAPR Workshop on Document Analysis Systems, Nelson, New Zealand, 13-15 Feb. 2006 (Hereinafter Déjean, et al.) and K. Hadjar, M. Rigamonti, D. Lalanne, R. Ingold, "Xed: a new Tool for eXtracting Hidden Structures from Electronic Documents," DIAL'04, 2004 (Hereinafter Hadjar, et al.) can be applied. Both solutions provide output in XML, but the analysis is carried out differently. In the approach of Déjean, et al., processing is performed using native PDF pieces of information, if available, and then using a table of contents (ToC) analysis algorithm for recreating document original structure and an XY-cut based algorithm for identifying image/text separation. In addition, features related to the proportion between recurring text blocks are exploited for Header and Footer detection. When native PDF pieces are not present, and when the system is dealing with PostScript files, the approach proposed in Hadjar, et al., can be exploited. This approach is based on image processing techniques for document layout structure analysis; in particular, segmentation algorithms are combined with a bottom up approach for image and text objects extractions.

A sample output of this object detection step is illustrated in FIG. 5, where the page image is segmented into various threads, which are identified by their pixel locations and sizes. Within each thread, images are identified as well as text blocks. An XML file, such as that shown in FIG. 5, is thus associated with a specific job ID and it lists all the images with their correct position on the document as well as text objects. The three types of document elements here considered, namely images, text, and document subparts (header and footer), may be characterized with quantitative features.

In this way, features related to each image or document page may be recorded, such as one or more of:

Image mean contrast, saturation, exposure, and color balance

Number of text blocks

Header and footer characteristics

Ratio of number of text blocks to number of Images

Background Color

Step 218B includes the association of the aesthetic enhancement operations with the print job ID. This may consist of successfully detecting, e.g., at the DFE level, which operations have been performed on the print job. Typical operations that may detected as being related to image quality improvement include:

RGB/CMYK Workflows: the parameter used in color-managed workflow to select an emulation profile (e.g. SWOP, Euroscale) that matches the International Color Consortium color profile embedded in the file.

Tone Reproduction Curves for C (cyan), Y (yellow), M (magenta), and K (key—black)

Screening method: this indicates the screening resolution (how many lines per inch for each of the four color screens) and other features of the halftone screen selected Brightness, Contrast values Gray Component Replacement (GER)

Ink Saving (GCR), this represents the grey component replacement.

For enhancement operations performed, parameters associated with the operations may be stored. These parameters may be numerical values, e.g., varying between 0 and 1, or discrete binary values, i.e., 0 or 1. While enhancements performed at the pre-press level can also be tracked in this way, the range of operations and parameters is typically much greater and thus more difficult to model.

Tracking of a Print Job's Versions (S220)

Figure 6:
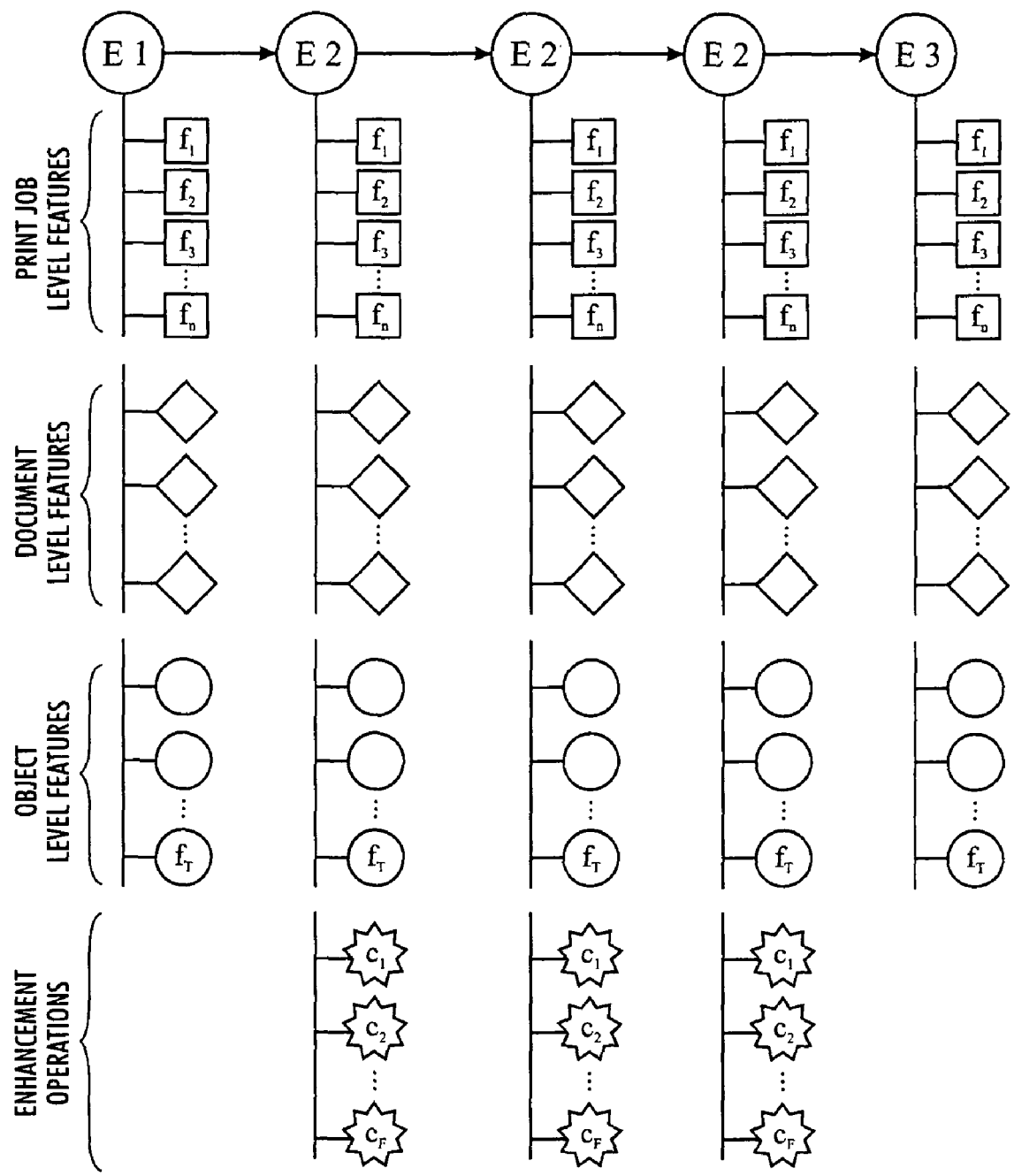
FIG. 6 illustrates features extracted from a print job and enhancement operations detected during events represented by E1, E2, and E3 in a workflow process.

An aim of print job tracking is to recreate job history tracks containing a chronologically ordered set of the different versions produced around a single print job with pertaining features, as illustrated schematically in FIG. 6 for a single print job. The job history tracks allows the model 26 to associate a group of print jobs sent to the digital press, some of which in reality merely constitute test prints of the same incoming print job, with the various modifications related to aesthetic enhancement performed on the incoming print job. To perform this, a first step is to classify each print job in relation to four categories directly related to the first three main events illustrated schematically in FIG. 1.

Figure 7:
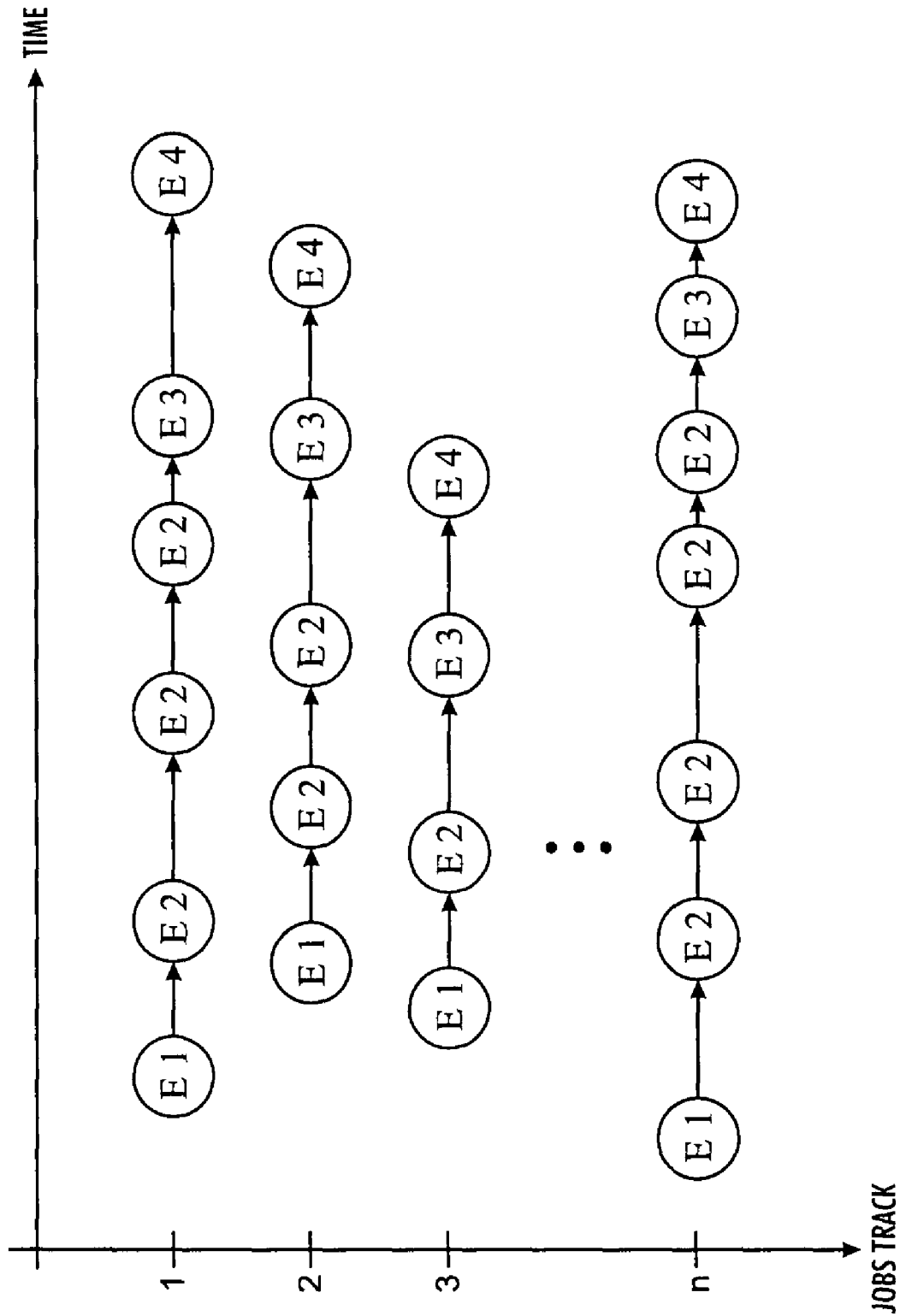
FIG. 7 represents a job tracking scheme for associating events with a particular print job.

Events related to E1 (i.e., new print jobs) can be simply recognized by inspecting the printing queues. E3 jobs (production printing) can be detected by looking at specific print level features (e.g., number of copies, etc.). Typically, a production printing event involves printing multiple copies. All unclassified print jobs are assumed to be E2 events, namely test print jobs. Once print jobs are classified, a "history track" can be created, as illustrated, for example, for print jobs numbered 1-n in FIG. 7. The track starts with an E1 print job and it involves different repetitions of E2 events for quality enhancement. It terminates with E3 when the final version of the print job is sent to the printer for the production print run and then delivered to the client (E4). In order to assemble such a chronological representation for each document, some of the features mentioned in for step S218, above, can be exploited. An objective here is to match the various documents found in the print queues and to associate each current print job with the correct history track. Ideally, the method is resilient to document changes due to variable data modification and to enhancement operations which in general do not alter the content but the perceptual quality of the print job. Different techniques are available for evaluating a distance measure for assessing the similarity between different documents. In particular, above-mentioned application Ser. No. 11/431,288, incorporated herein by reference, proposes to exploit print level features, such as print job page specification information, owner, and timing information to do the matching. In addition, the application proposes inspecting TIFF images generated from each page of the print job and computing a signature measure based on a typical Eigen space approach, by dividing the images into blocks and projecting the blocks into a single N-dimensional vector (i.e., the signature). Such approaches may be utilized in the methods disclosed herein for associating print job proof events E2, and optionally final print events E3, with a print job ID. Ideally, the page signature, regardless the way it is defined, satisfies the condition that any given page can provide a unique signature. Close signatures correspond to similar pages; where there is a low probability of different pages having a similar signature. Given a new print job detected on the printer queue, the probability of similarity and the current histories, a new history is instantiated when a print job is classified as E1, whereas when E2 occurs, the print job is attached to the corresponding track. An E3 print job marks the end of a specific track that will not be taken into account for future comparisons.

Aesthetic Enhancements Model Learning (S222)

Given print job's history track, the features associated to each print job version, as well as the aesthetic enhancement operations detected at the DFE, a model can be created. The model encodes the relationship between the typology of the document (defined in terms of print job features) and the most used sequence of enhancement operations. This is typically represented by the set of enhancement operations selected for the last iteration of E2 in the print job's track history.

A subset of features among the ones proposed in S218 may be selected in order to characterize the print job's perceptual quality and typology (e.g., calendar, brochure, photo album, color photo album, B&W brochure, brochure with lots of text, etc.):

$$\overline{x}_{E_i} = [f_1, \ldots, f_n, \ldots, f_T] \qquad \text{Eqn. 1}$$

Where $f_1$, etc are features from the print job level, document level, and object level features listed above, such as paper size, color mode, and in general, any of those features that directly and indirectly specify the typology of the printed document. The model may synthesize the features to identify the most discriminative features for providing a job typology.

In addition, enhancement operations as well as their parameterization are taken into account:

$$\overline{c} = [c_1, \ldots, c_F] \qquad \text{Eqn. 2}$$

where $c_1$, etc are the enhancement operations performed, such as those listed for step S218B above. In this way, the model encodes the relationship between feature vectors $\overline{x}_{E_1}$ associated with print job versions with corresponding enhancement operations vectors $\overline{c}$.

In order to learn the model, different approaches can be exploited such as support vector machines (SVMs), Sparse Logistic Regression, Neural Networks, or other supervised learning methods. Training of the model can be performed on the basis of the job history tracks from where vectors $x_{E_i}$ can be deduced and corresponding correction vectors $\overline{c}$ identified.

The model 26 thus developed from data acquired in multiple print jobs can be used to inform the enhancement process by providing suggestions for enhancement operations in a subsequently submitted print job. Thus, step S104 of the exemplary method of using the model (FIG. 3) may include extracting features of the submitted print job in a similar manner to that described in the characterization section (S218A). The evaluation of candidate enhancement operations at S106 may then include generating a vector $x_{E_i}$ for the submitted print job, as described above for Eqn. 1, and comparing the vector with vectors stored in the model (e.g., by computing a similarity measure) to find the closest match(es) and retrieving correction vectors $\overline{c}$ for the matching jobs from the model. The correction vector for one or more of the stored print jobs can be used to generate the set of proposed enhancement operations for the submitted print job.

In general, the model 26, once generated, is specific to the workflow for a particular print shop or printing press for which it was generated, although in some instances, it may be applicable to two or more printing presses in a print shop where these are used substantially interchangeably. The model may be updated on a semi-continuous basis, as new jobs are processed. Or, the model may be updated intermittently, for example, when it becomes apparent that the operator is rejecting a significant proportion of the proposed automated enhancements.

The model 26 can be applied to both automated non color-managed workflows and manual non color-managed workflows. As will be appreciated, the use of automated workflow systems, such as Xerox FreeFlow™ workflow solutions, does not eliminate the need for proofing and aesthetic parameterization where the workflow is not fully color managed. For example, both FreeFlow™ Process Manager and FreeFlow™ Print Manager allow for color correction and parameter configuration at the DFE. The exemplary system and method allow for color correction and parameter selection to be configured with the adaptive heuristics of a manual non color-managed workflow, providing a more efficient approximation of client intent without disrupting the automated workflow with operator intervention.

The manual parameterization (selection and modification of printing parameters of the images for aesthetic control) of a job typically requires a number of iterative testing cycles, where test copies that are printed subsequent to each modification are used to judge what further modifications are necessary until a result is reached that adequately matches client intent. This process does not represent an efficient use of the digital press, and the proposed system, which is adaptive and can be trained off-line, can be integrated at the DFE in a manual non color-managed workflow to provide a suggestion of the best fitting printing parameters for any given job based on user-behavior learned heuristics, effectively reducing the number of iterations in the testing cycle, as illustrated in FIG. 2.

Figure 4:
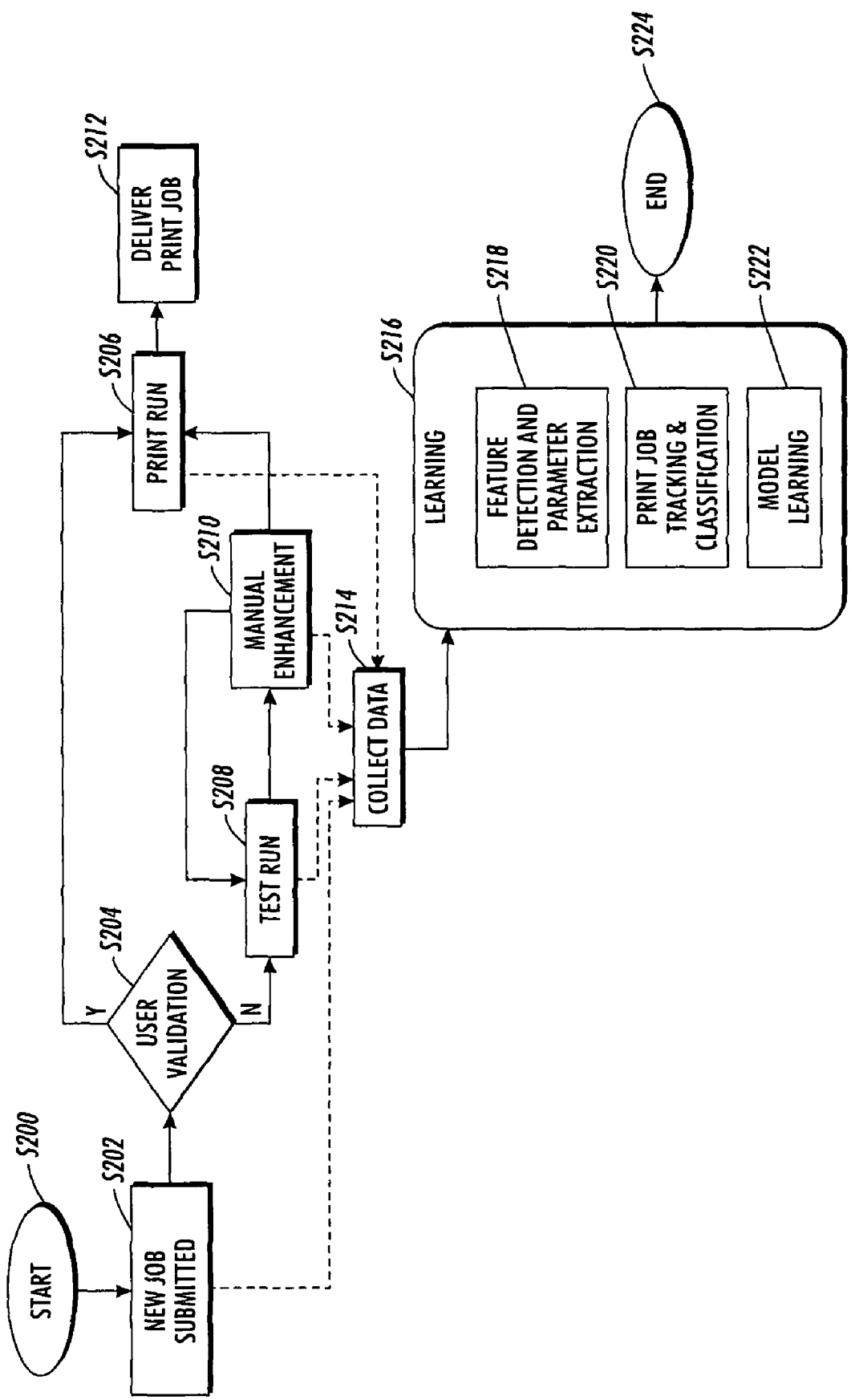
FIG. 4 illustrates a method for developing a model for modeling print job aesthetics enhancements suitable for use in the apparatus and method of FIGS. 2 and 3, in accordance with another aspect of the exemplary embodiment.

The methods illustrated in FIGS. 3 and 4 may each be implemented in a computer program product that may be executed on a computer, such as that resident in the printer DFE. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

Parts of the exemplary methods, such as the training of the model, may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 3 or 4, can be used to implement the exemplary methods described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An automated method for processing a print job comprising:
   generating a predictive model, comprising, for each of multiple prior print jobs:
      characterizing the prior print job through a set of features;
      and
      associating any enhancement operations performed on the prior print job with the characterized prior print job;
   thereafter, receiving a submitted print job;
   extracting features from the submitted print job for characterizing the print job;
   comparing the extracted features of the submitted print job with the predictive model, including computing a similarity measure to identify at least one closest matching prior characterized print job based on its set of features; and
   generating at least one proposed enhancement operation for the submitted print job based on the enhancement operations performed on the at least one closest matching prior print job identified in the comparison.

2. The method of claim 1 further comprising:
   determining a confidence measure that a probability that the features of the submitted print job match the features of a prior print job stored in the model, such that the proposed at least one enhancement operation is appropriate for the submitted print job and, where the determined confidence exceeds a threshold level, automatically printing the print job with the at least one proposed enhancement operation.

3. The method of claim 1 further comprising:
   presenting the print job with the at least one proposed enhancement operation to an operator and, if accepted by the operator, printing the print job incorporating the proposed at least one enhancement operation.

4. The method of claim 3, wherein the at least one proposed enhancement operation for the print job is presented to an operator via a graphical user interface.

5. The method of claim 3, wherein if at least one of the proposed enhancement operation is rejected by the operator, providing the operator access to manual enhancement operations.

6. The method of claim 5, further comprising, logging manual enhancement operations selected by the operator for updating the predictive model.

7. The method of claim 1, wherein the features are selected from the group consisting of:
   print job level features related to the print job;
   document level features related to a document within the print job;
   object level features related to sub-parts which compose the document; and
   combinations thereof.

8. The method of claim 7, wherein the features include at least one print job level feature selected from the group consisting of: a customer identification; a job type; a number of copies of the same document; a paper size; an imposition method; a time the job was launched; a print range; and combinations thereof.

9. The method of claim 7, wherein the features include at least one print document level feature selected from the group consisting of: color mode; relative amount of black toner to be using when printing grays and black; number of pages; and combinations thereof.

10. The method of claim 7, wherein the features include at least one object level feature selected from the group consisting of: image mean contrast; image saturation, image exposure; image color balance; number of text blocks; header and footer characteristics; ratio of a number of text blocks to a number of images; background color; and combinations thereof.

11. The method of claim 1, wherein the features are selected so as to characterize jobs from a given customer according to their typology.

12. The method of claim 1, wherein at least one of the printing parameters performed on the prior print jobs is selected from the group consisting of:
   a selection of an emulation mode;

a tone reproduction curve selected for at least one of the available colorants to be used in rendering the print job;
a selection of a screening method;
a brightness modification;
a contrast modification;
a selection of a gray component replacement parameter;
a selection of an ink saving parameter; and
combinations thereof.

13. The method of claim 1, further comprising, prior to submitting the print job, generating the model.

14. The method of claim 1, wherein the associating of any enhancement operations includes creating a history track for a prior print job which links test print jobs, printed prior to production printing of the print job, and their associated enhancement operations with the prior print job.

15. A computer program product comprising a tangible computer-readable recording medium encoding instructions, which when executed on a computer causes the computer to perform the method of claim 1.

16. The method of claim 1, wherein the computing of the similarity measure includes computing a features vector for the submitted print job and comparing the computed features vector with features vectors of prior print jobs stored in the model.

17. A print management system for processing a print job comprising:
a model in which for each of multiple prior print jobs, features extracted from the prior print job are linked to enhancement operations which were performed on the prior print job, the features including an identification of a customer that submitted the print job; and
an automated aesthetics enhancement tool which extracts features from a submitted print job, compares the extracted features with the model and generates proposed enhancement operations for the submitted print job based on the comparison.

18. The print management system of claim 17, wherein the an automated aesthetics enhancement tool determines a confidence that the proposed enhancement operations are appropriate for the submitted print job and, where the confidence exceeds a threshold level, automatically causes the print job to be printed with the proposed enhancement operations.

19. A printing system comprising the print management system of claim 17 and a digital press for printing the print job on print media.

20. The printing system of claim 19, further comprising a user interface for presenting proposed enhancement operations to an operator and enabling the user to verify the proposed enhancement operations.

21. A method for generating a model for proposing automated enhancement operations for a submitted print job comprising:
for each of a plurality of print jobs:
characterizing the print job through a set of features including a print job level feature related to the print job, and at least one of a document level feature related to a document within the print job and an object level feature related to sub-parts which compose the document
associating any enhancement operations performed by an operator on the print job with the characterized print job, including, for each of a plurality of print jobs, creating a history track which links test print jobs printed prior to production printing and their associated enhancement operations with the print job; and
modeling the characterized print jobs and associated enhancement operations, whereby proposed enhancement operations for a submitted print job are generated when the model is accessed with features of the submitted print job.

22. The method of claim 21, wherein the characterizing of the print job through a set of features comprises computing a features vector and wherein the associating any enhancement operations performed by an operator on the print job comprises computing an enhancement operations vector.

23. The method of claim 21, wherein the modeling exploits a supervised learning method.

24. The method of claim 8, wherein the at least one print job level feature include a customer identification and a job type.

* * * * *